April 27, 1971     W. B. GOLDSWORTHY     3,576,705
UNCURED RESIN COATED FILAMENT REINFORCED PRODUCT
Filed Oct. 12, 1967     2 Sheets-Sheet 1
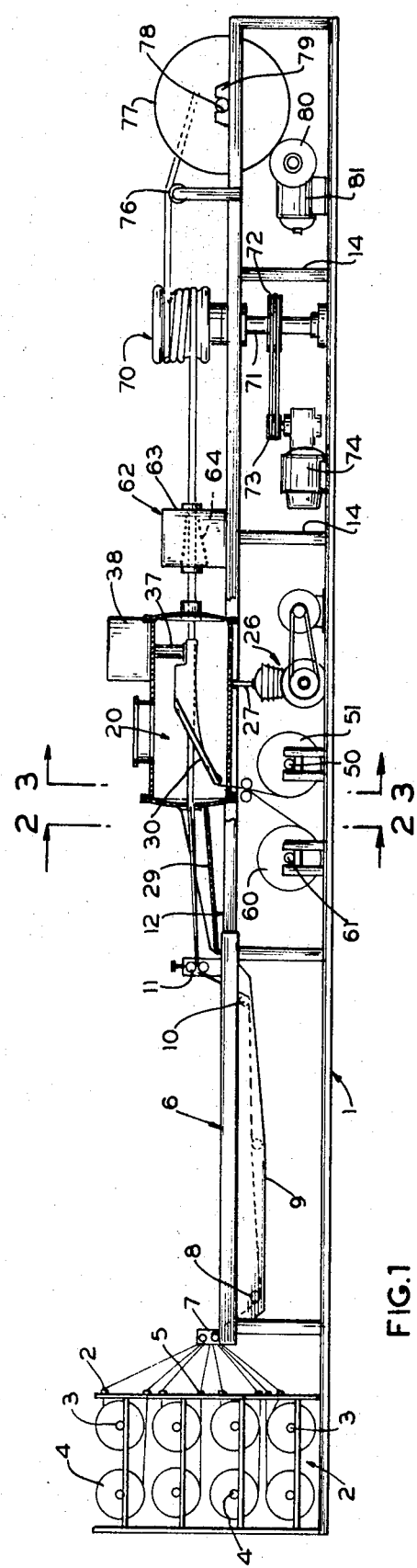
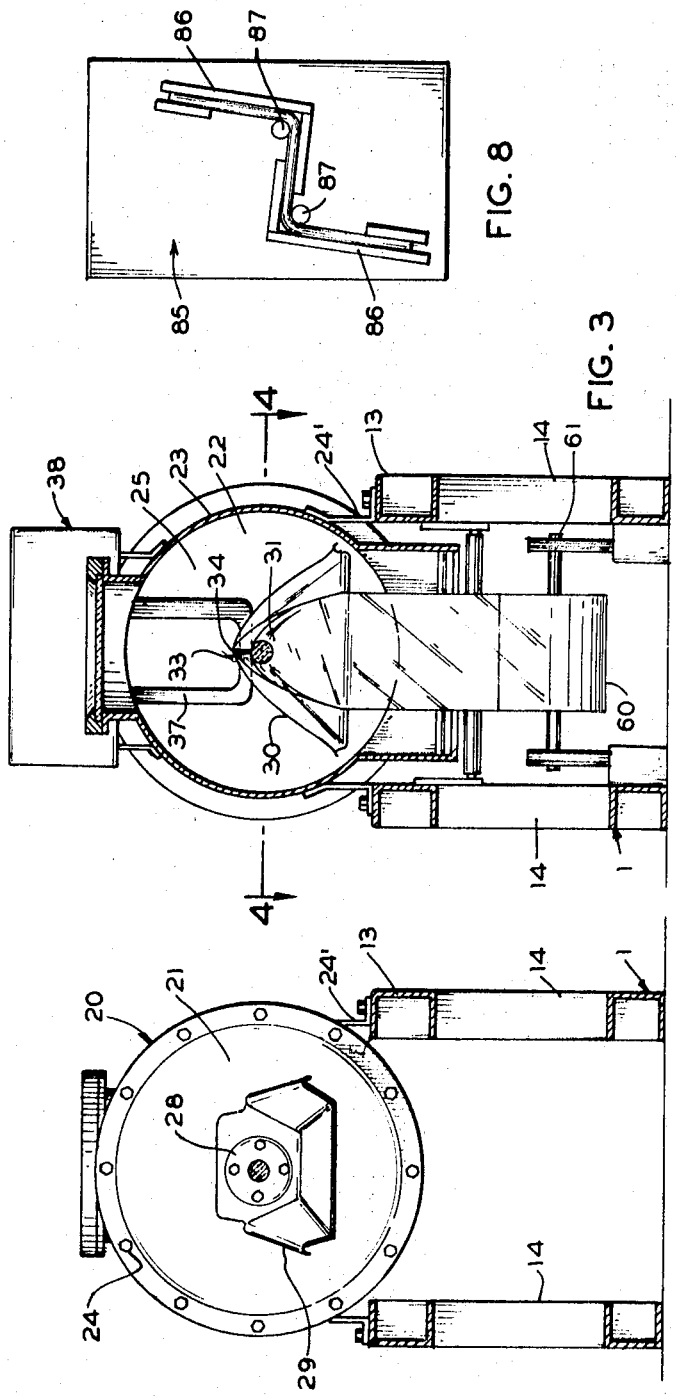
INVENTOR
WILLIAM B. GOLDSWORTHY
BY
*Robert J. Schaap*
ATTORNEY April 27, 1971     W. B. GOLDSWORTHY     3,576,705
UNCURED RESIN COATED FILAMENT REINFORCED PRODUCT
Filed Oct. 12, 1967     2 Sheets-Sheet 2
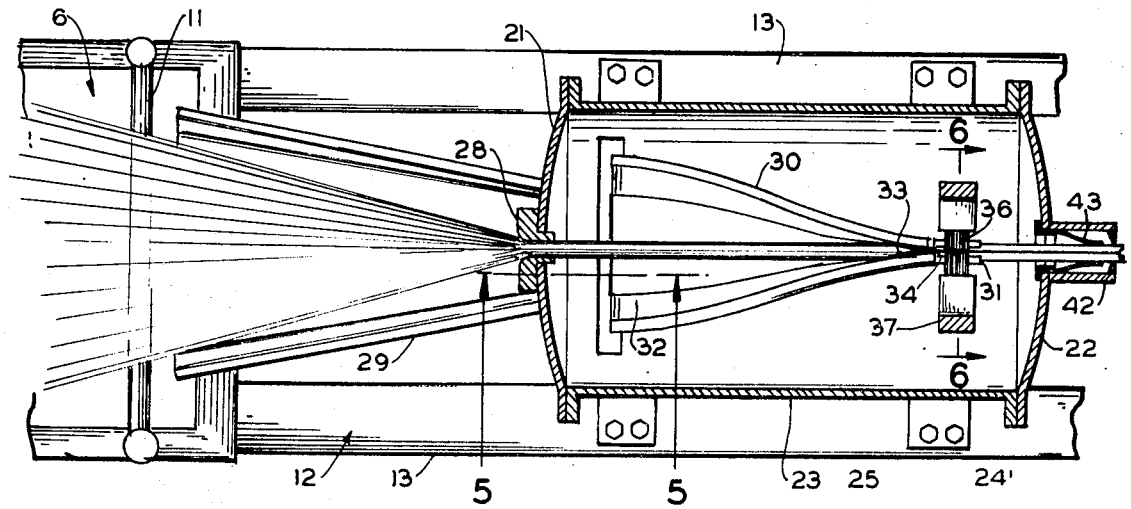
FIG. 4
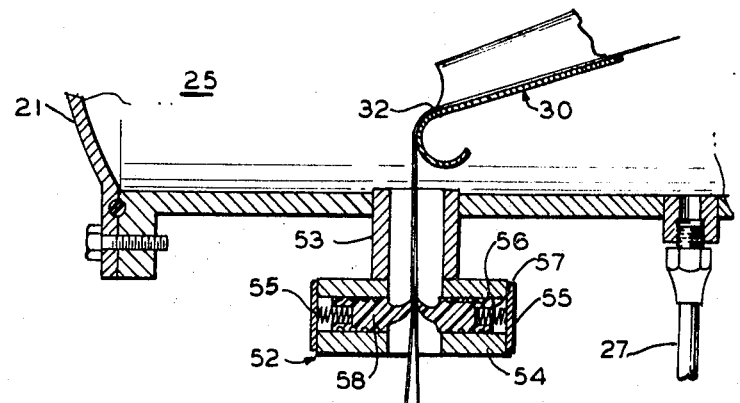
FIG. 5
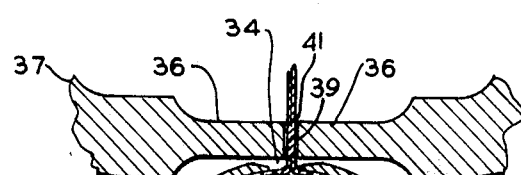
FIG. 6     FIG. 7
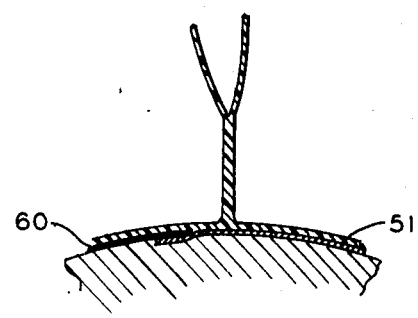
INVENTOR
WILLIAM B. GOLDSWORTHY
BY
*Robert J. Schaap*
ATTORNEY United States Patent Office
3,576,705
Patented Apr. 27, 1971

3,576,705
UNCURED RESIN COATED FILAMENT
REINFORCED PRODUCT
William B. Goldsworthy, 2504 Novato Place,
Palos Verdes Estates, Calif. 90274
Filed Oct. 12, 1967, Ser. No. 674,820
Int. Cl. B32b 5/08
U.S. Cl. 161—143
7 Claims

ABSTRACT OF THE DISCLOSURE

Fiberglass filament unwound from a series of spools is impregnated with a resin matrix and passed through a pair of rollers or sizing bushing for removing the excess resin and air therefrom. The resin impregnated fiber glass is then envelopely enclosed within a sheet of unidirectionally oriented plastic film, the latter being sealed along its upper longitudinal margin by means of an ultrasonic weld or heat weld. The film enclosed composite may then be heated to shrink the film. The temperature should be sufficiently low to have no curing effect on the resin leaving it in the uncured or so-called "A-stage." For some systems it is desirable to advance the resin to a semi-cured or so-called "B-stage." The film enclosed composite may then be wound upon suitable reels and stored for further use.

---

The present invention relates in general to certain new and useful improvements to filament reinforced profiles, and more particularly to a method and apparatus for making A-stage filament reinforced profiles.

Due to the various inherent disadvantages of structural metals, such as aluminum and steel, reinforced plastics and fiberglass structural shapes have found widespread use. The structural metals are inherently disadvantageous as a material of construction due to the expensive apparatus necessary to form these materials to a desired shape and also because such materials are readily subjected to corrosive effects. Furthermore, such materials are in constant need of painting and other protective coatings. In addition, it is often difficult and expensive to imprint a desired design on the exterior surface of metal structural profiles.

There are a number of commercially available devices, such as the device described in U.S. Letters Patent No. 2,871,911 for producing filament reinforced profiles on a continuous basis. However, in all of the commercially available devices, the profiles are cured into a rigid form during the actual production thereof. Once the matrix system in a filament reinforced profile has been cured, the profile is rendered substantially incapable of being formed or bent to a desired shape. As a result of this problem, filament reinforced profiles have not been used in many applications where their employment could present great advantage over the structural metal profiles.

It is, therefore, the primary object of the present invention to provide a method and apparatus for producing A-stage filament reinforced profiles.

It is another object of the present invention to produce an apparatus and method of the type stated for making rod-shaped structural elements on a continuous basis and rendering the same inactive for ultimate curing to a rigid state.

It is an additional object of the present invention to provide an apparatus and method of the type stated which is capable of producing A-stage filament reinforced rod-like profiles on a mass-production basis and at a relatively low unit cost.

It is another salient object of the present invention to provide a method and apparatus of the type stated for rendering a desired external appearance and design to the exterior surface of a filament reinforced profile.

It is also an object of the present invention to provide a method and apparatus of the type stated for producing A-stage filament reinforced profiles enclosed within an outer cover and which is capable of being stored for curing and use at a later date.

With the above and other objects in view, my invention resides in the novel features of form, construction, combination and arrangement of parts presently described and pointed out.

In the accompanying drawings: (2 sheets)

FIG. 1 is a side elevational view of an apparatus for producing filament reinforced profiles which apparatus is constructed in accordance with and embodies the present invention;

FIGS. 2 and 3 are vertical sectional views taken along lines 2—2 and 3—3 respectively of FIG. 1;

FIG. 4 is a horizontal sectional view taken along line 4—4 of FIG. 3;

FIG. 5 is a vertical sectional view taken along line 5—5 of FIG. 4 and showing an air lock forming part of the present invention;

FIG. 6 is a vertical sectional view taken along line 6—6 of FIG. 4 and showing the seam welding of the oriented film in the process of the present invention;

FIG. 7 is a schematic view showing the type of seal achieved through the process of the present invention; and FIG. 8 is a schematic view illustrating die blocks for forming the profile of the present invention.

GENERAL DESCRIPTION

The present invention relates to a method and an apparatus for producing rod-shaped filament reinforced profiles on a continuous basis in an A-stage or B-stage condition where the profile may be continuously wrapped on a spool and stored for further use. The apparatus generally comprises a creel having a plurality of filament spools. Filament is unwound from the spools and passed through a resin tank for impregnation of a resin matrix in the filament. The resin impregnated filament is then passed through a sealing ring and into a vacuum tank.

A continuous sheet of unidirectionally oriented plastic film is also passed into the vacuum tank and disposed within an enveloping tube. The tube which is initially flat, curves into a completely circumferential form. The resin impregnated filament is disposed upon the film and enclosed within the film as it passes through the tube. The film and the filament enclosed therein is continually pulled through the vacuum tank by means of a capstan located externally of the vacuum tank. As the plastic film is completely wrapped around the filament, the film is sealed by means of an ultrasonic weld, which does not affect the uncured matrix impregnated in the fiberglass filament, thereby forming an uncured rod-shaped profile.

As the film enclosed fiberglass is passed through the tube, the air and excess resin is forced rearwardly. The profile is then passed into a tunnel oven or hot water bath for shrinking the plastic film. The temperature in the shrinking operation is sufficiently low so that no curing effect takes place in the resin leaving the same in the uncured or so-called "A-stage." After the profile has been formed, it can then be wound upon any conventional reel or spool for storing. For certain filament-resin systems it is possible to cause the resin matrix to cure to a semi-cured stage or so-called "B-stage," wherein the resin impregnated filament is partially cured or gelled.

When it is desired to use the profile, the profile can then be bent or shaped into any desired form and cured in that form for ultimate use.

DETAILED DESCRIPTION

Referring now in more detail and by reference characters to the drawings which illustrate a preferred embodiment of the present invention, FIG. 1 designates an apparatus for producing rod-shaped A-stage filament reinforced profile. The apparatus generally comprises a base plate 1 which is provided with a creel 2, the latter having a plurality of upstanding racks 2'. Upwardly and outwardly extending pins 3 are mounted on each of the racks for retaining conventional spools of filament or roving 4. The strands of filament or so-called "rovings" are passed through eyelets 5 which are mounted on the upstanding racks 2'. In many operations, it is desirable to separate the creel 2 from the remainder of the apparatus in order to provide for convenient interchangeability of creels.

The strands of filament are then passed into a resin tank 6 which is also mounted on the base plate 1. The tank is provided with a roller 7 at its left transverse end, reference being made to FIG. 1. The strands are then passed under a hold-down roller 8 located near the bottom wall 9 of the tank 6. The roving is next passed on a second hold-down roller 10 located at the right transverse end of the tank, reference being made to FIG. 1 and then passed through a pair of squeeze-out rollers 11, which are mounted on the upper end of the tank 6, substantially in the manner as illustrated in FIG. 1. It can be seen that the rollers 11 serve as a type of ringer for removing the excess resin and air from the filament strands. The tank is preferably filled with a heat curable liquid resin which is capable of being cured into a rigid state upon heating.

Any continuous natural or synthetic filament capable of being bent to conform to a desired shape can be employed in the present invention. The most preferred filament employed in the present invention is that made of glass. However, it should be recognized that boron filaments, filaments from lithium and other grown-whisker crystals can be employed. In addition, metal wire may be interspersed with the glass filaments in the event that it is desired to add some type of metallic body to the fiber glass reinforced structure which is produced, such as for electrical conductivity. Furthermore, quartz filaments may also be employed.

Any material which is normally a liquid or which is capable at some stage of the process of being liquefied and softened for a period of time may be employed as the resin binder or so-called "matrix." The matrix should be sufficient to flow into the filament and fill the interstices between adjacent filaments and layers thereof before heating or polymerization would render the same rigid. Furthermore, the matrix should possess the ability to adhere to the reinforcement. Some examples of the suitable binders or matrix which can be employed in the present invention are various thermoplastic resins, such as nylon, polyethylene, polypropylene, many of the polycarbonates, etc. In addition, thermosetting resins such as polyesters, many of the phenolics and epoxys, etc. can be used. Generally, the thermosetting resins should be capable of being fused into an insoluble, non-heat softening mass upon application of heat or similar method of triggering the catalytic system. Other binders or matrices are hard waxes, eutectic ceramics, eutectic metals, synthetic rubbers, etc.

Rigidly mounted on the base plate 1 to the right of the resin tank 6 is a supporting structure 12 which generally comprises a pair of transversely spaced longitudinal support rails 13, which are supported by upwardly extending struts 14, in the manner as illustrated in FIGS. 1-3. The rails 13 and struts 14 may be in the form of any standard U-shaped structural section.

The strands of filament are next passed into a vacuum housing 20 having a left end wall 21, a right end wall 22, and an annular side wall 23. The end walls 21, 22 are removably secured by bolts 24. Furthermore, the housing 20 is secured to the longitudinal support rails 13 by means of brackets 24'. The housing 20 forms an internal vacuum chamber 25 and is connected to a suitable vacuum pump 26 and related system through a pipe 27. The left end wall 21 is suitably apertured and provided with a bushing or sealing ring 28 preferably formed of neoprene rubber, for receiving the filament strands into the chamber 25. The bushing 28 is sized only to accommodate the strands of roving so that it can achieve a seal in order to prevent disturbances of vacuum conditions in the vacuum chamber 25. A tray 29 is connected to the left end wall 21 and terminates at the tank 6 for conducting into the tank any small amounts of entrained excess resin that may be removed from the filament bundle at the bushing 28.

Suitably mounted within the housing 20 by means of any conventional supporting structure is a wrapping tube 30 or so-called "forming chute," which is more fully illustrated in FIGS. 3 and 4. The wrapping tube 30 is curved about its longitudinal axis and is initially formed from a flat metal sheet. The radius of curvature decreases progressively along the longitudinal axis of the tube 30 to form an exit aperture 31. It can be seen that the left-hand end of the tube 30, reference being made to FIG. 4 is only slightly curved and in essence, forms a receiving tray 32, which is also curved downwardly. As the distance along the tube 30 progresses to the right-hand end thereof, reference being made to FIG. 4, the longitudinal margins are curved upwardly and inwardly so that the tube would form a surface of revolution, the circumference and radius of which would decrease with progression along the longitudinal axis thereof. The two longitudinal margins of the tube 30 are curved upwardly until they are only separated by a small distance and are then struck upwardly in the form of a pair of spaced, opposed upwardly extending flanges 33 separated by a longitudinal slot 34. It can be seen that at the point where the tube is formed with the upwardly extending flanges 33, the diameter of the tube is approximately the same diameter as the strands of filament, which is passed thereinto. The tube 30 may also be formed by casting the same from sheet metal or can be made of plastic in any conventional forming operation.

The upper half of the right-hand end of the tube 30 is cut away for accommodation of a pair of metallic plates 36 forming part of a yoke 37 which is in turn operatively associated with an ultrasonic sealing device 38. The ultrasonic device 38 is conventional in its construction and is, therefore, neither further illustrated nor described in detail herein. However, the plates 36 have substantially the same size and shape as the portion of the flanges 33 of the tube 30 which was removed and are provided with opposed flat walls 39 which are separated by a longitudinal gap 41.

The right end wall 22 is provided with a discharge tube 42 having an annular Teflon seal 43 for accommodation of the filament strands as they are pulled through the vacuum housing 20.

Mounted on the base plate 1 beneath the housing 20 is a spindle 50 for rotatably retaining a spool of unidirectionally oriented plastic film or sheet 51. The film 51 is admitted to the vacuum chamber 25 through a vacuum sealing gate 52 which is mounted on the underside of the housing and which is more fully illustrated in FIG. 5. The vacuum sealing gate 52 generally comprises a cylindrical tube 53 which is mounted on the underside of the housing 20 and which in turn communicates with a horizontally disposed gate tube 54, which is in turn provided with end walls 55. The tube 54 is provided with a longitudinal central bore 56 for accommodating compression springs 57 which abut against each of the end walls 55. The compression springs 57 are designed to bias Teflon seals 58 into engagement with each other in the manner as illustrated in FIG. 5. The Teflon seals 58 are shiftably disposed within the bore 56 and are biased into engagement with each other by means of the springs 57. Thus, it can be seen that the seals 58 will bear against the flat planar surfaces of the plastic sheet 51 as it passes into the chamber 25 and thereby provide a vacuum seal.

The plastic sheet is disposed upon the left hand end of the tube 30 in the manner as illustrated in FIG. 1, and is passed through the tube 30. The resin impregnated strands of filament are disposed upon the upper surface of the plastic sheet and are pulled through the tube 30 simultaneously therewith. It can be seen that the plastic sheet is pulled through the tube 30, the longitudinal margins thereof will curve in conformance with the cross sectional shape of the tube. Furthermore, the longitudinal margins of the plastic sheet will extend into the longitudinal slot 34 between the pair of upstanding flanges 33. Actuation of the ultrasonic sealing unit 38 will seal the upper longitudinal margins of the plastic sheet around the strands of resin, thereby enclosing the resin impregnated filament. However, the ultrasonic sealing of the plastic film will not in any way affect the heat curable resin. In addition, it can be seen that the tube 30 at its right-hand end is formed with substantially the same cross sectional shape and size as the wrapped filament. By means of this construction, the air that may be entrained between the filament strand and the film will be forced rearwardly as the wrapped strands are pulled through the discharge end 31 of the tube 30. While it is not absolutely necessary to employ a vacuum housing 20 for wrapping the film about the filament, this type of structure is desirable. It is also possible to employ form rolls in place of the forming chute illustrated and described for wrapping the film about the filament composite. In many cases rubber content form rolls have been found to be effective to remove any possibility of wrinkles in the film.

Some of the plastic films which are capable of being used in connection with the present invention are some of the vinyl copolymers such as vinylidene chloride. The important criterion is that the film must be uniaxially oriented so that it will shrink only in one direction. The films used herein are unidirectionally oriented films capable of being shrunk in a direction transverse to the longitudinal action of said films. Other films which may be employed in connection with the present invention are various thermoplastic materials such as styrene, styrene-butadiene copolymers, Mylar films, polyethylene, some of the polyvinyl alcohols, etc.

The design or surface finish of the film is suitably transferred to the composite of resin-impregnated filament, and when the film is removed after curing of the composite the design on the film is transferred to the exterior surface of the composite. Embossing on the surface of the film can also be imparted to the surface of the composite.

The catalyst which is employed in the resin depends upon the type of operation which is used. It is possible to obtain a translucent or transparent profile and therefore an ultraviolet catalyst such as benzoin may be employed. This is a preferred catalyst since it gives a minimum exothermic reaction and a minimum cure shrink. Catalysts such as benzyl peroxide would be used in cases of heat curing. It is also possible to add a dye, a pigment or filler material to the resin so that the latter is impregnated in the filament as it is passed into the vacuum housing 20. For example, it may be desirable to impregnate the plastic material with a gold glitter type of material and this material would be added to the resin tank 6.

It is also possible to employ a second plastic film 60, which is mounted on a spindle 61, the latter in turn being secured to the base plate 1 in the manner as illustrated in FIG. 1. The plastic film 60 can serve as decorative type of coating and can also be wound upon the resin impregnated fiber glass. The film 60 is also passed into the vacuum chamber 25 through the vacuum sealing gate 52. In the event that it was desired to use the decorative film 60 along with the film 51, the decorative film would probably be applied to the resin impregnated fiber glass with the heat shrinkable film 51 disposed therearound. In essence, the heat shrinkable film 51 would provide the outer cover. If the dual type of film were employed, in use, the decorative film 60 would probably remain upon the exterior surface of the fiber glass profile.

The envelopely covered filament is next passed into a shrinking zone 62 which includes an outer housing 63 mounted on the longitudinal support rails 13 in the manner as illustrated in FIG. 1. The housing 63 is provided with a conventional heating element 64 for heating the film 51 to the desired temperature,, thereby causing the same to shrink around the outer surface of the resin impregnated filament. The temperature of the heating element 64 is carefully controlled so that only enough heat is provided to shrink the plastic film 51, but not to actuate the catalyst in the resin matrix. In general, the shrinking zone is kept at a temperature of about 140° F. to 250° F. The resin matrix will not be energized and the profile thus formed will still be in the A-stage. Shrinking of the film is a time-temperature function and therefore shrinking zone temperatures are governed by the speed of operation. It can be seen that the plastic film 51 prevents any of the catalyst from evaporating or creating any oxidation thereof since the matrix does not come into contact with air. It is possible to heat the resin impregnated fiber glass in the shrinking zone 62 to a temperature where the resin matrix is partially gelled or energized to the so-called "B-stage." In addition, a second heating zone could be employed if it is desired to cure the resin to a B-stage.

The film is pulled outwardly through the vacuum housing 20 and the shrinking zone 62 by means of a capstan which serves as a pulling unit 70. The capstan is mounted upon a drive rod 71, the latter in turn being rotatably mounted on the base plate 1 in the manner as illustrated in FIG. 1. The drive shaft 71 is provided with a pulley 72, which coacts with a matching drive pulley 73 on a conventional electric motor 74. A drive belt 75 is trained around the pulleys 72, 73. A number of turns of the profile is wrapped around the capstan 70 and then passed over a guide roller 76 for winding upon a spool 77. However, it should be recognized that other forms of pulling units could be employed, such as a pair of driven wheels, a pair of engageable movable tractor belts or reciprocating gripper blocks. In many cases under/over single pass drums have been found to be effective for substitution of the capstan.

By further reference to FIG. 1, it can be seen that the spool 77 is mounted upon a conventional spindle 78, the latter in turn being held by transversely spaced guides 79 mounted upon each of the support rails 13. The spool 77 is, in turn, driven by a drive wheel 80, the latter being energized by a conventional electric motor 81. Thus, it can be seen that the pulling unit 70 is designed only to pull the profile form through the vacuum housing 20 and shrinking zone 62 at a desired rate of speed. Furthermore, the profile form is wound upon the spool 77 at this desired rate of speed. After the profile has been wound upon the spool 77, it can be stored for long periods of time until further use. In general, it is desirable to store the profile form at a temperature which does not exceed 40° F.

In use, a profile form can be cured in any desired shape or form. For example, FIG. 8 provides a typical forming block set 85 which includes a pair of L-shaped guides 86 and a pair of rollers 87. It can be seen that by placing a section of the profile in the "A" or "B" stage, in a suitable forming element, the profile can be bent into a desired form. This particular form represents a portion of a chair frame. After the profile has been bent to this form, it can then be heated or cured to the "C" stage or rigid stage. It should be recognized that any conventional shaping mechanism could be employed and that the profile could be bent to any desired form.

Any conventional curing mechanism can be used to obtain softening or melting and activation of the catalysis system in any thermosetting resin. Generally, the method of heating is chosen to provide correct energy for heating a particular material. It is possible to employ infrared heating or heated air or gas in many systems for curing the resin matrix. Ultraviolet curing and radio frequency heating is also very advantageous for curing the resin matrix in the profile of the present invention. The radio frequency generators used for the curing of the matrix generally operate in the VHF or UHF range. Such method of heating is more fully described in the W. B. Goldsworthy Pat. No. 2,871,911 and generally employs frequencies such as 13.5 megacycles, 27.1 megacycles, and 40.6 megacycles.

It should be understood that changes and modifications in the form, construction, arrangement and combination of parts can be made and substituted for those herein shown without departing from the nature and principle of my invention.

Having thus described my invention, what I desire to claim and secure by Letters Patent is:

1. A substantially rod-shaped uncured filament reinforced product having a substantially circular shape in cross section and comprising a plurality of filament strands, a substantial portion of which have their longitudinal axis aligned, a curable matrix interspersed around said strands and being in the A-stage to form a bendable composite of filament strands and matrix, and an air-tight plastic film completely enveloping said strands and having a pair of longitudinal margins parallel to the longitudinal axis of said strands and which longitudinal margins are welded in an air-tight seal, said film tightly enclosing substantially all of the exposed surface of said composite in said film so that the composite exists in substantially an air-free environment, said film being substantially impervious to air so that a catalyst in said matrix does not oxidize or evaporate to thereby enable storage of said product for extended periods of time in said soft flexible stage whereby upon curing a rigid shaped article of desired profile form is achieved.

2. The product of claim 1 further characterized in that said filament is fiberglass.

3. The product of claim 1 further characterized in that said matrix is a liquid resin which is heat curable.

4. The product of claim 1 further characterized in that said composite has a surface finish imparted by said film.

5. The product of claim 1 further characterized in that said film is unidirectionally oriented so that the film is capable of undergoing a dimensional change in a direction transverse to the longitudinal axis of said strands.

6. An uncured filament reinforced product comprising a plurality of filament strands, a substantial portion of which have their longitudinal axis aligned, a curable matrix interspersed around said strands and being in the A-stage to form a bendable composite of filament strands and matrix, and an airtight plastic film completely enveloping said strands and having a pair of longitudinal margins parallel to the longitudinal axis of said strands and which longitudinal margins are welded in an air-tight seal, said film tightly enclosing substantially all of the exposed surface of said composite in said film so that the composite exists in substantially an air-free environment, said film being substantially impervious to air so that a catalyst in said matrix does not oxidize or evaporate to thereby enable storage of said product for extended periods of time in said soft flexible stage whereby upon curing a rigid shaped article of desired profile form is achieved.

7. The product of claim 6 further characterized in that said film is unidirectionally oriented so that the film is capable of undergoing a dimensional change in a direction transverse to the longitudinal axis of said strands.

References Cited
UNITED STATES PATENTS

| | | | |
|---|---|---|---|
| 2,631,955 | 3/1953 | Muskat | 156—323 |
| 2,951,006 | 8/1960 | Rubenstein (006) | 161— Rubenstein Dig. |
| 3,111,569 | 11/1963 | Rubenstein (569) | 161— Rubenstein Dig. |
| 2,802,764 | 8/1957 | Slayter et al. | 161—43X |
| 2,969,301 | 1/1961 | Finger | 161—Glass Fabric Dig. |
| 3,172,593 | 3/1965 | Potter | 161—43UX |
| 2,821,155 | 1/1958 | Seckel | 161—175X |
| 2,852,424 | 9/1958 | Reinhart et al. | 161—Glass Fabric Dig. |
| 3,233,870 | 2/1966 | Gerhardt | 161—143X |
| 3,371,476 | 3/1968 | Costello et al. | 57—149 |

WILLIAM A. POWELL, Primary Examiner

U.S. Cl. X.R.

156—85, 166, 201, 204, 213, 215, 227, 306, 438, 465, 468; 161—168, 175, 402